US012658666B2

(12) United States Patent
Bragin et al.

(10) Patent No.: US 12,658,666 B2
(45) Date of Patent: Jun. 16, 2026

(54) EXCIMER LASER WITH IMPROVED BEAM UNIFORMITY AND STABILITY

(71) Applicant: Coherent LaserSystems GmbH & Co. KG, Göttingen (DE)

(72) Inventors: Igor Bragin, Göttingen (DE); Jozsef Bekesi, Göttingen (DE)

(73) Assignee: Coherent LaserSystems GmbH & Co. KG, Göttingen (DE)

( * ) Notice: Subject to any disclaimer, the term of this patent is extended or adjusted under 35 U.S.C. 154(b) by 608 days.

(21) Appl. No.: 18/141,859

(22) Filed: May 1, 2023

(65) Prior Publication Data

US 2024/0372313 A1　　Nov. 7, 2024

(51) Int. Cl.
H01S 3/225 (2006.01)
H01S 3/08 (2023.01)
H01S 3/134 (2006.01)

(52) U.S. Cl.
CPC .......... H01S 3/225 (2013.01); H01S 3/08059 (2013.01); H01S 3/134 (2013.01)

(58) Field of Classification Search
CPC ....... H01S 3/225; H01S 3/134; H01S 3/08059
See application file for complete search history.

(56) References Cited

U.S. PATENT DOCUMENTS

| | | | |
|---|---|---|---|
| 4,953,175 A | 8/1990 | De Silvestri et al. | |
| 7,408,714 B2 | 8/2008 | Windpassinger et al. | |
| 7,428,039 B2 | 9/2008 | Ferber | |
| 7,615,722 B2 | 11/2009 | Govorkov et al. | |
| 8,116,347 B2 | 2/2012 | Wakabayashi et al. | |
| 8,238,400 B2 | 8/2012 | Targsdorf et al. | |
| 8,804,780 B2 | 8/2014 | Wakabayashi et al. | |
| 11,183,808 B2 | 11/2021 | Bragin et al. | |
| 2007/0280311 A1* | 12/2007 | Hofmann | B23K 26/0738 |
| | | | 372/30 |
| 2019/0006811 A1 | 1/2019 | Scholz-Riecke et al. | |
| 2020/0303889 A1 | 9/2020 | Bragin et al. | |

OTHER PUBLICATIONS

Yurkin, "New mirror for a laser resonator," 1991, Sov.J. Quantum Electron. 21 (4), p. 447-448. (Year: 1991).*
International Search Report and Written Opinion received for International Patent Application No. PCT/EP2024/061991 mailed on Aug. 13, 2024, 14 pages.

* cited by examiner

*Primary Examiner* — Michael Carter
(74) *Attorney, Agent, or Firm* — Morrison & Foerster LLP

(57) ABSTRACT

An excimer laser includes a chamber for containing a gas mixture between a rear end and a front end of a linear laser resonator, a convex end-mirror defining the rear end, and a plurality of output-coupling mirrors collectively defining the front end. The output-coupling mirrors are distributed along an optical axis of the resonator and have respective normal vectors pointing toward the rear end. The normal vectors include four mutually non-parallel normal vectors, wherein no three of the four mutually non-parallel normal vectors are coplanar. These different orientations of the output-coupling mirrors cooperate with the convex end-mirror to blur fine structure in the output beam of the resonator.

19 Claims, 8 Drawing Sheets

EXCIMER LASER WITH IMPROVED BEAM UNIFORMITY AND STABILITY

TECHNICAL FIELD OF THE INVENTION

The present invention relates in general to resonator mirror arrangements for excimer lasers. The present invention relates in particular to the reduction of spatial fine structure in the output beam.

DISCUSSION OF BACKGROUND ART

Excimer lasers generate high-power laser-radiation in the ultraviolet region of the electromagnetic spectrum. The gain-medium is a flowing pressurized gas mixture, which typically includes a noble gas, a halide gas, and buffer gases. The gas mixture is energized by a short current pulse between two elongated electrodes to create excited weakly-bonded dimers in a gas discharge. The gas mixture includes, for example, xenon (Xe) and hydrogen chloride (HCl) gases, plus helium (He) or neon (Ne) as a neutral buffer gas. In this example, the gas discharge creates electronically excited xenon-chloride (XeCl) dimers having a laser line at 308 nanometers (nm). With appropriate substitutions, other dimers with other laser lines may be created, such as argon-fluoride (ArF) dimers with a laser line at 193 nm, xenon-fluoride (XeF) dimers having a laser line at 351 nm, or krypton-fluoride (KrF) dimers having a laser line at 248 nm.

Typically, the gas mixture is energized at repetition rates of up to a few kilohertz, the gas discharge can be sustained for a duration of a few nanoseconds up to a few hundred nanoseconds, the output laser pulse has a duration of a few nanoseconds up to a few tens of nanoseconds, and the average output laser power can be up to many hundreds of watts. The most powerful state-of-the-art industrial excimer lasers are based on XeCl and generate pulse energies up to 1 joule at pulse repetition rates up to 600 hertz. The Lambda SX excimer laser from Coherent Corp. of Saxonburg, Pennsylvania is an example of such an excimer laser that can operate continuously for over 100 million pulses, while maintaining very high pulse-energy stability and stable beam parameters. In applications requiring even greater pulse energy, the output of two or more excimer lasers can be combined by beam-mixing optics and synchronization of pulse delivery. Such beam-mixing and synchronization are described in U.S. Pat. Nos. 7,408,714 and 8,238,400, respectively, each of which is incorporated herein by reference in its entirety.

Many different laser applications benefit from the short wavelength and high average power of excimer lasers. Laser recrystallization of silicon is one important application for which excimer lasers is a favored source. This process is used in the manufacture of flat panels, for screens of consumer electronic devices and large-format display screens, to lithographically produce electronic circuits in a thin layer of amorphous silicon on a glass substrate. In designated locations, defined by a lithography mask, the silicon layer is repeatedly melted by a pulsed beam of laser radiation until a desired crystalline micro-structure is obtained. Beam delivery optics shape the laser beam into an elongated "line beam" having a uniform intensity distribution along its length. The substrate is scanned relative to the line beam in a scanning direction that is orthogonal to the length of the line beam. The recrystallization process is delicate and relies on maintaining a stable and uniform laser intensity distribution with the optimum energy density.

Methods and apparatus for shaping excimer laser beams into line beams are described in U.S. Pat. Nos. 7,428,039 and 7,615,722, the complete disclosures of which are incorporated herein by reference. These methods incorporate beam homogenization to achieve a uniform laser intensity distribution. The beam homogenization entails spatially partitioning the laser beam from one or more sources into line beams, and then projecting the partitioned line beams onto the silicon layer such that the partitioned line beams are overlaid on each other. For example, between ten and thirty partitioned line beams may be overlaid on each other on the silicon layer, and each partitioned line beam may have dimensions of about 0.4 millimeters (mm) in the short axis and between 760 mm and 1500 mm in the long axis. Beam homogenization requires expensive and complex optical arrangements, including lens arrays that will accommodate a large excimer laser beam, for example having transverse dimensions of 15 mm×35 mm. Further homogenization, by temporal averaging, is achieved by exposing each location on the silicon layer to multiple laser pulses, e.g., 10 to 20 consecutive laser pulses.

Excimer laser beams typically have fine structure in the transverse spatial mode caused by instabilities in the gas discharge, turbulence in the gas flow, and/or contamination of the gas-containment windows. Furthermore, the fine structure is unstable and changes significantly from pulse to pulse. As a result, the local energy density of an excimer laser may have a standard deviation of greater than 10%, or even greater than 20%, while the integrated energy of the whole beam has a standard deviation of less than 0.3%. When an excimer laser beam is used to recrystallize silicon, the fine structure can lead to variances in the crystalline microstructure. Fine structure is more difficult to homogenize than coarse structure, particularly when the fine structure is smaller than the individual lenses in the lens array used in conventional excimer laser beam homogenization.

Excimer laser resonators that produce an excimer laser beam with less fine structure are disclosed in U.S. Pat. No. 11,183,808, incorporated herein by reference in its entirety. These resonators utilize additional partially-reflecting mirrors to partition the intracavity laser beam so as to generate a composite output beam with less fine structure. While a conventional excimer laser resonator has a single high-reflector at one end and a single output-coupler at the other end, the resonators of U.S. Pat. No. 11,183,808 (a) replace the single high-reflector with a high-reflector and a partial reflector serially arranged on the optical axis and tilted in different directions, and/or (b) replace the single output-coupler with a pair of output-couplers serially arranged on the optical axis and tilted in different directions.

SUMMARY OF THE INVENTION

Disclosed herein is an excimer laser with a resonator configuration that reduces fine structure in the output laser beam to improve beam uniformity and stability. A front end of the resonator includes at least four output-coupling mirrors distributed along the optical axis of the resonator and oriented at different respective tilt-angles relative to the optical axis. A convex end-mirror forms the rear end of the resonator.

The plurality of output-coupling mirrors may be viewed as partitioning the intracavity laser beam into a plurality of overlapping intracavity beam components. The output beam is a composite beam with contributions from each of the intracavity beam components. Each intracavity beam component has a slightly different propagation path through the chamber containing the gaseous gain medium. Intracavity nonuniformities, such as in the gain profile of the gaseous gain medium and/or in the transmission coefficient of the gas containment windows, lead to fine structure in each intracavity beam component. However, due the different propagation paths of the intracavity beam components through the intracavity nonuniformities, the fine structure is blurred and thus reduced when out-coupled portions of the intracavity beam components are combined in the output beam. As a result, the beam uniformity is improved. In addition, since the fine structure in each intracavity beam component varies temporally, the reduction of fine structure improves the beam stability.

We have found that the convex shape of the end-mirror, as opposed to a planar end-mirror, significantly improves the blurring of fine structure achieved with the plurality of output-coupling mirrors. The use of a convex end-mirror thereby leads to further improvements in beam uniformity and stability. Although a plano-convex linear laser resonator is fundamentally unstable, the use of a convex end-mirror in the present resonator causes only a slight reduction in output power, as compared to when using a planar end-mirror. An additional benefit of the convex end-mirror is a larger transverse size of the output beam, which reduces the local intensities on downstream optics such as beam delivery optics. The use of a convex end-mirror therefore reduces the risk of optical damage in the downstream optics as well as undesirable thermal aberrations and nonlinear effects that may result from high local intensities.

In certain embodiments, the curvature of the convex end-mirror is adjustable. This adjustability allows for tuning the divergence and transverse size of the output beam to be most suitable for a given use scenario. For example, the output beam divergence and size may be matched to downstream optics such as beam delivery optics.

In one aspect of the invention, an excimer laser includes a chamber configured to contain a gas mixture between a rear end and a front end of a linear laser resonator, a convex end-mirror defining the rear end, and a plurality of output-coupling mirrors that collectively define the front end. The plurality of output-coupling mirrors is distributed along an optical axis of the linear laser resonator, and have a respective plurality of normal vectors pointing toward the rear end. The plurality of normal vectors includes four mutually non-parallel normal vectors. No three of the four mutually non-parallel normal vectors are coplanar.

BRIEF DESCRIPTION OF THE DRAWINGS

The accompanying drawings, which are incorporated in and constitute a part of the specification, schematically illustrate preferred embodiments of the present invention, and together with the general description given above and the detailed description of the preferred embodiments given below, serve to explain principles of the present invention.

DETAILED DESCRIPTION OF THE INVENTION

Figure 1:
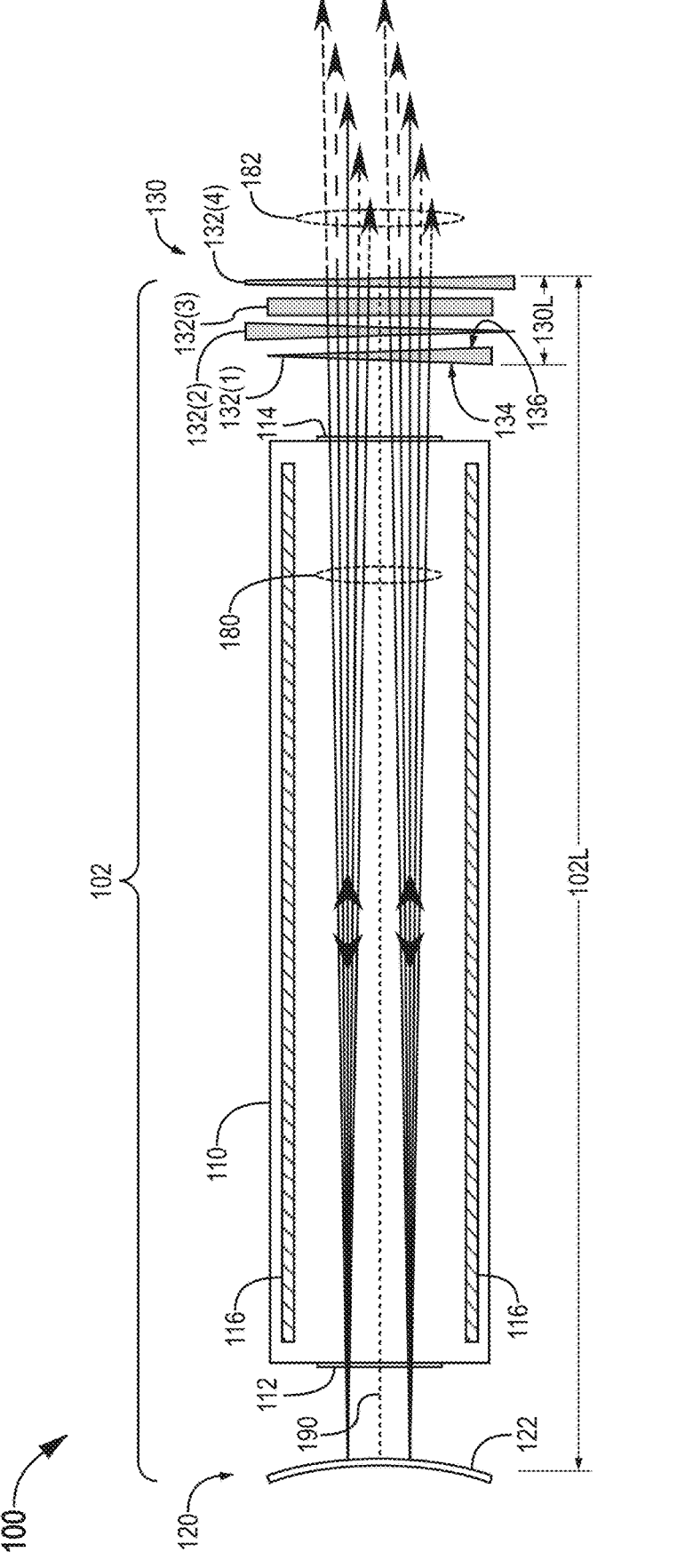
FIG. 1 illustrates, in cross-sectional view, an excimer laser with a linear resonator configuration that reduces fine structure in the output laser beam to improve the uniformity and stability of the output beam, according to an embodiment. The front end of the resonator is formed by a plurality of partially reflective wedges, and the rear end of the resonator is formed by a convex end-mirror.

Referring now to the drawings, wherein like components are designated by like numerals, FIG. 1 is a cross-sectional view of one excimer laser 100 with a resonator configuration that reduces fine structure in the output laser beam 182 to improve the uniformity and stability of output beam 182. Laser 100 has a linear resonator 102 with a rear end 120 and a front end 130. Rear end 120 is formed by a convex end-mirror 122. Front end 130 is formed by a plurality of wedges 132. In the example depicted in FIG. 1, laser 100 has four wedges 132(1), 132(2), 132(3), and 132(4). Laser 100 may be configured with a different number of wedges.

Laser 100 further includes a chamber 110 configured to contain the gas mixture that serves as the gain medium for laser action. Chamber 110 is disposed on an optical axis 190 of resonator 102. Herein, the "optical axis" of a laser resonator refers to a longitudinal center axis of the intensity distribution of laser radiation inside the laser resonator. Although not shown in FIG. 1, and typically not the case in an excimer laser, optical axis 190 may be folded. Chamber 110 may be equipped with a rear window 112 and a front window 114 that transmit the intracavity beam 180 of laser 100. Alternatively, chamber 110 may be made of glass or another material transmissive to intracavity beam 180. Laser 100 may also include two or more electrodes 116 arranged to generate a discharge in the gas mixture inside chamber 110.

Wedges 132 are distributed along optical axis 190 over an axial distance 130L. Axial distance 130L is typically less than 10% or less than 1% of the length 102L of resonator 102. Resonator length 102L may be in the range between 0.5 and 3 meters. Each wedge 132 has a rear-facing surface 134 and a front-facing surface 136 (only labeled in FIG. 1 for the rearmost wedge 132(1)). Surfaces 134 and 136 may be planar. Surfaces 134 and 136 are partially reflective to intracavity beam 180. The reflectivity of each surface 134 and 136 may be in the range between 1% and 10% at the wavelength of intracavity beam 180. Intracavity beam 180 and output beam 182 are typically ultraviolet, for example with a wavelength in the range between 100 and 400 nm. Each surface 134 and each surface 136 forms a respective output-coupling mirror of resonator 102. Each wedge 132 may be made of glass. Surfaces 134 and 136 may be uncoated surfaces. End-mirror 122 may be highly reflective at the wavelength of intracavity beam 180, for example with a reflectivity of at least 99%, to minimize the amount of light leakage out of resonator 102 that does not contribute to output beam 182.

Figures 2, 3:
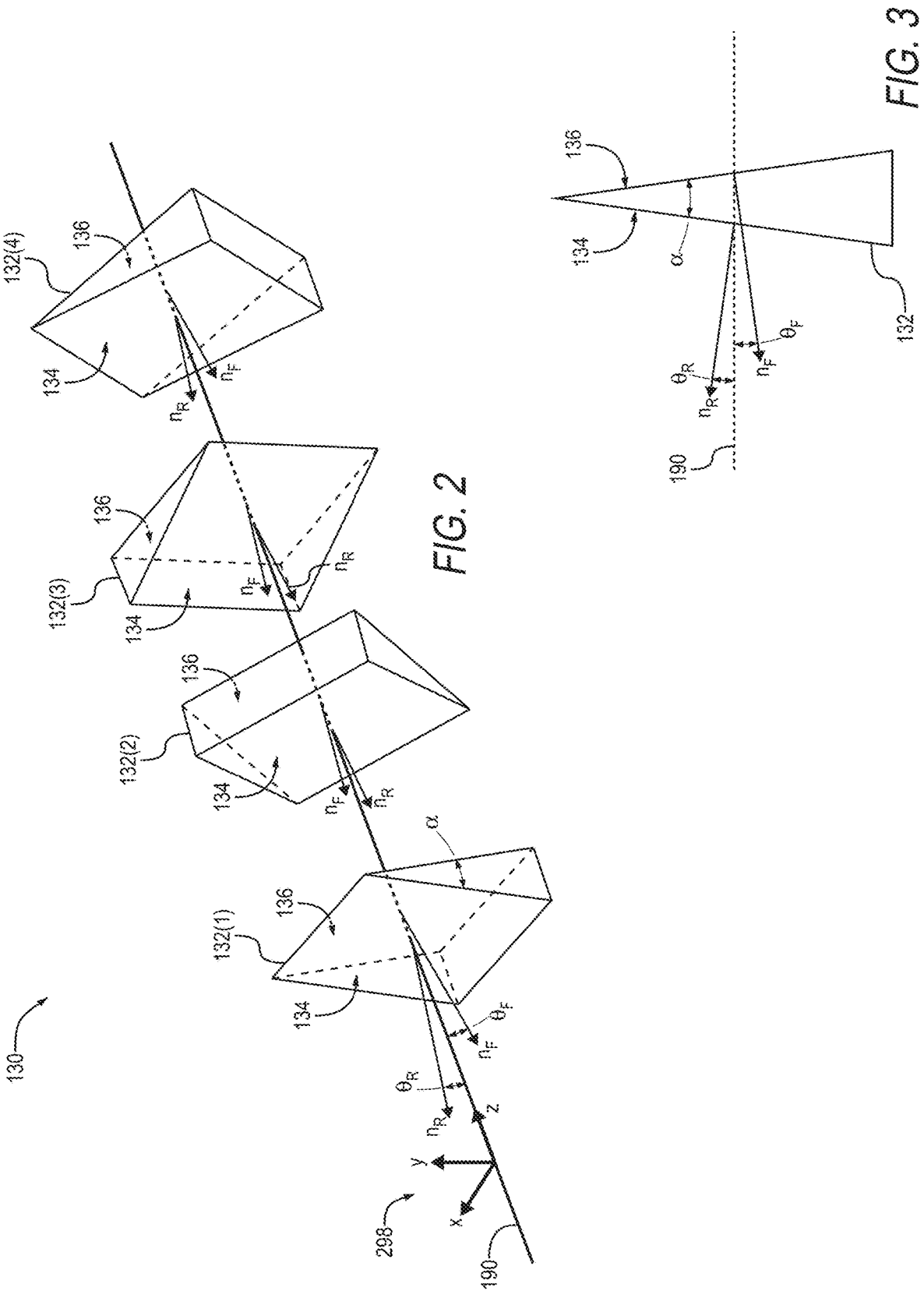
FIG. 2 is a perspective view of wedges of the front end of the linear laser resonator of FIG. 1.
FIG. 3 is a cross-sectional view of a single wedge of the front end of the linear laser resonator of FIG. 1.

FIG. 2 is a perspective view of wedges 132 of front end 130. Here, optical axis 190 coincides with the z-axis of a cartesian coordinate system 298. (The cross section of FIG. 1 is taken in the yz-plane of coordinate system 298.) Wedges 132 are at different respective orientations about the z-axis (i.e., about optical axis 190). In the depicted example, wedge 132(2) is rotated approximately 135 degrees counter-clockwise about the z-axis relative to wedge 132(1), wedge 132(3) is rotated approximately 90 degrees clockwise about the z-axis relative to wedge 132(1), and wedge 132(4) is rotated approximately 45 degrees counter-clockwise about the z-axis relative to wedge 132(1). The distance between wedges 132, depicted in FIG. 2, is exaggerated for clarity.

FIG. 3 is a cross-sectional view of wedge 132 with the cross section taken in a plane that contains optical axis 190. The FIG. 3 diagram is applicable to any one of wedges 132 of laser 100. Surfaces 134 and 136 are at a wedge angle $\alpha$ to each other. In most practical implementations, wedge angle $\alpha$ is much smaller than shown in FIG. 3. In one example, wedge angle $\alpha$ is no more than approximately 0.5 milliradian (mrad), for example in the range between 0.02 and 0.5 mrad. Surfaces 134 and 136 have respective normal vectors $n_R$ and $n_F$. Normal vectors $n_R$ and $n_F$ are at respective angles $\theta_R$ and $\theta_F$ to optical axis 190. Since the primary purpose of each of surfaces 134 and 136 is to reflect laser radiation propagating toward the surface along the positive z-axis direction, the directions of normal vectors $n_R$ and $n_F$ are both chosen to be generally along the negative z-axis direction even though surface 136 faces generally in the positive z-axis direction. Thus, both normal vectors $n_R$ and $n_F$ point in the general direction toward rear end 120.

Referring again to FIG. 2, each wedge 132 has a respective wedge angle $\alpha$, and respective normal vectors $n_R$ and $n_F$. Angles $\alpha$, $\theta_R$, and $\theta_F$ are shown only for rearmost wedge 132(1). Angles $\alpha$, $\theta_R$, and $\theta_F$ may or may not be the same for all wedges 132. In one embodiment, angles $\theta_R$ and $\theta_F$ are less than 0.1 mrad. Wedges 132 may be of different shapes than shown in FIG. 2. For example, each wedge 132 may be truncated instead of surfaces 134 and 136 coming together at a sharp edge.

Simplistically, and without being bound by theory, each surface 134 and each surface 136 may be viewed as forming an individual laser resonator together with end-mirror 122. Each of these individual laser resonators supports a component of intracavity beam 180. Due to the different tilt angles between surfaces 134 and 136 and optical axis 190, intracavity beam 180 thus includes multiple beam components propagating at non-zero angles to each other. Each such beam component contributes to output beam 182 when coupled out of front end 130. These beam components are schematically indicated in FIG. 1 by the multitude of rays inside resonator 102, and outside resonator 102 in output beam 182 with different styles of dashes. The different propagation directions of these beam components result in blurring of fine structure in output beam 182.

The convex curvature of end-mirror 122 has been found to significantly improve the blurring of fine structure, as compared to a planar end-mirror. Without being bound by theory, the convex shape of end-mirror may improve blurring through more than just a single mechanism. Continuing with the simplistic view where each surface 134 and 136 forms an individual laser resonator with end-mirror 122, the convex shape of end-mirror 122 may help support beam components in each of these individual laser resonators. The convex shape of end-mirror 122 may also provide coupling between these individual laser resonators, and the resulting mixing between the different beam components may amount to further blurring of fine structure. Additionally, even in a modified resonator with only a single planar output-coupling mirror at front end 130, the convex shape of end-mirror 122 has been found to provide some degree of fine-structure blurring in the output laser beam. Thus, the convex shape of end-mirror 122 blurs fine structure in the out-coupled beam from each of the individual laser resonators, even disregarding the combination of the beam components from these individual laser resonators and any possible coupling between therebetween. Some of the blurring effect provided by the convex shape of end-mirror 122 may be due to the fact that, regardless of the number of output-coupling mirrors, the convex shape leads to an increase in the transverse size of the output beam.

The larger beam size caused by the convex shape of end-mirror 122 has additional benefits. The larger beam size reduces the risk of optical damage in the downstream optics, as well as in the optical elements of rear end 120 and front end 130. The larger beam size also reduces any undesirable thermal aberrations and nonlinear effects that may result from the higher local intensities of a smaller beam in downstream optics or in front end 130.

End-mirror 122 may be implemented with any one of a variety of convex shapes. The exact convex shape of end-mirror 122 may be selected for the purpose of achieving a desired degree of fine-structure blurring and/or for the purpose of achieving a certain shape and size of output beam 182. In one embodiment, the convex curvature of end-mirror 122 is at least approximately symmetric with respect to rotation about optical axis 190. In this embodiment, end-mirror 122 may have spherical curvature. In another embodiment, end-mirror 122 has stronger curvature in one transverse dimension than in the orthogonal transverse dimension. In this embodiment, end-mirror 122 may be a toroidal or cylindrical mirror.

Strictly speaking, the convex curvature of end-mirror 122 renders resonator 102 unstable. However, a very mild curvature is typically sufficient to achieve the benefits discussed above. The losses introduced by the convex curvature of end-mirror 122 may therefore be insignificant, for example resulting in no more than a 10% reduction in the power of output beam 182. In one embodiment, the curvature of end-mirror 122 in any transverse dimension is characterized by a radius of curvature that exceeds length 102L of resonator 102. For example, the smallest radius of curvature attained by end-mirror 122 may be in the range between 10 and 200 times resonator length 102L.

Figure 5:
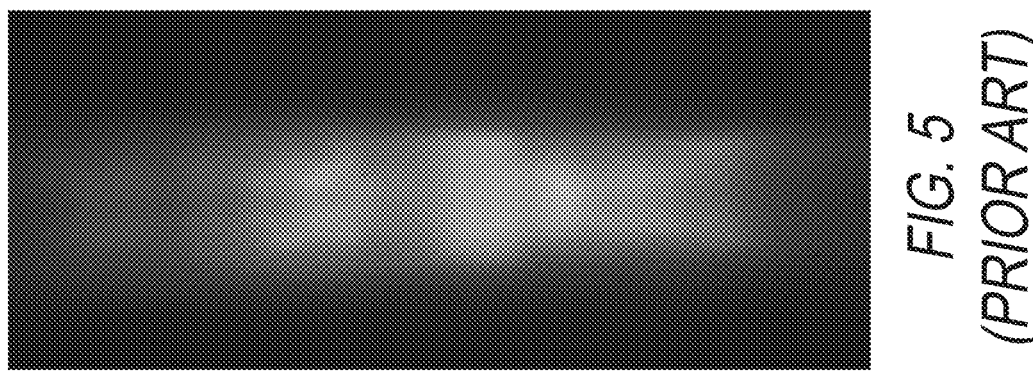
FIG. 5 is a far-field image of the output beam of a conventional excimer laser resonator of the same length as the resonator of the FIG. 1 laser and having the same chamber and electrode configuration.
Figure 4:
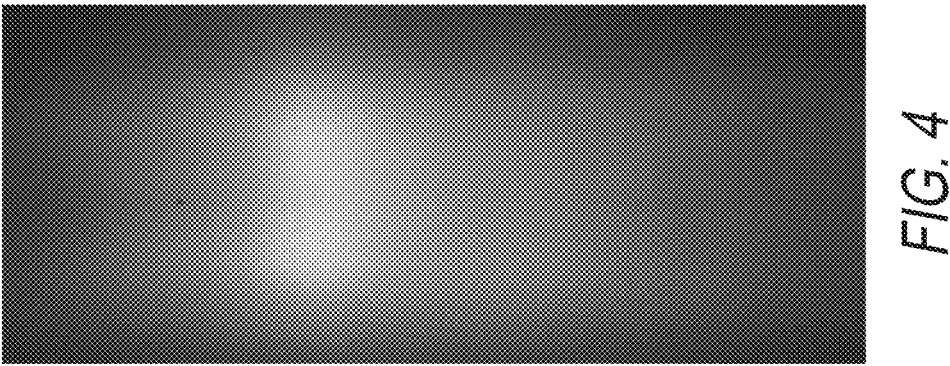
FIG. 4 is a far-field image of the output beam of one implementation of the excimer laser of FIG. 1, wherein the front end has six wedges at different orientations about the optical axis, and the convex curvature of the end-mirror is rotationally symmetric about the optical axis.

FIG. 4 is a far-field image of output beam 182 of one implementation of laser 100, wherein front end 130 has six wedges 132 at different orientations about optical axis 190, and the convex curvature of end-mirror 122 is rotationally symmetric about optical axis 190. For comparison, FIG. 5 shows a far-field image of the output beam of a conventional excimer laser resonator of the same length as resonator 102 and having the same chamber and electrode configuration. Substantial fine structure is visible in the output beam from the conventional resonator (FIG. 5). The beam uniformity is significantly improved in output beam 182 from resonator 102 (FIG. 4). Output beam 182 from resonator 102 is also clearly larger than the output beam from the conventional resonator, especially in the shorter beam dimension.

Figure 6:
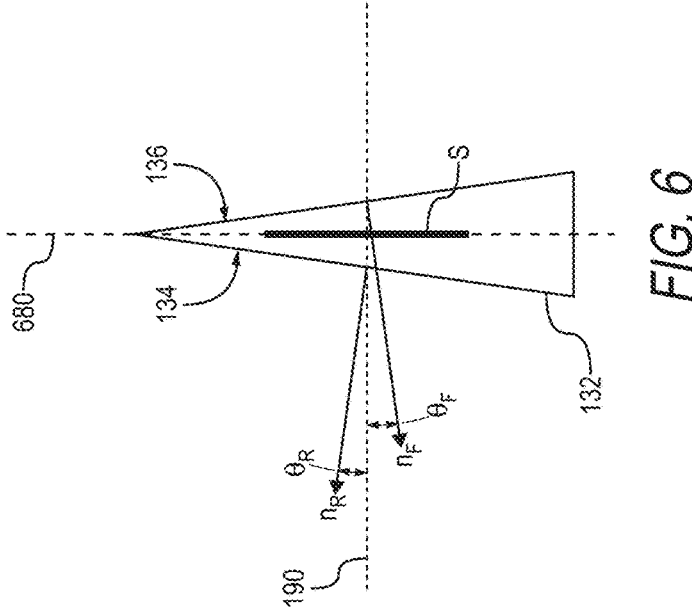
FIG. 6 illustrates a symmetry axis of the wedges of the front end of the linear laser resonator of FIG. 1.

FIG. 6 illustrates a symmetry axis S of wedge 132. The FIG. 6 diagram is applicable to any one of wedges 132 of laser 100. Symmetry axis S is (a) located in a mirror plane 680 between surfaces 134 and 136 and (b) coplanar with normal vectors $n_R$ and $n_R$ of surfaces 134 and 136. In the example depicted in FIG. 6, symmetry axis S is orthogonal to optical axis 190, corresponding to angles $\theta_R$ and $\theta_F$ being of equal magnitude. Alternatively, symmetry axis S may be at an oblique angle to optical axis 190, such that magnitude of angle $\theta_R$ is different from that of $\theta_F$. One of angles $\theta_R$ and $\theta_F$ may even be zero. In more extreme cases, angles $\theta_R$ and $\theta_F$ may be on the same side of optical axis 190 instead of on opposite sides as shown in FIGS. 2, 3, and 6. However, to limit losses in resonator 102, it may be preferable that angles $\theta_R$ and $\theta_F$ are on opposite sides of optical axis 190.

Figure 7:
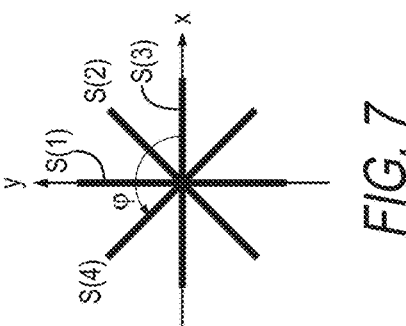
FIG. 7 is a diagram showing exemplary orientations of symmetry axes about the optical axis of the linear laser resonator of FIG. 1.

FIG. 7 is a diagram showing exemplary orientations of symmetry axes S about optical axis 190 in laser 100. The FIG. 7 diagram pertains to the example configuration of wedges 132 depicted in FIGS. 1 and 2 and shows the projection of symmetry axes S of the four wedges 132 onto the xy-plane of coordinate system 298 (see FIG. 2). Each of the four symmetry axes S(1), S(2), S(3), and S(4) of wedges 132(1), 132(2), 132(3), and 134(4), respectively, is oriented at a different azimuthal angle q about optical axis 190. In the depicted example, the four symmetry axes S are balanced in that they are evenly distributed about optical axis 190.

Figure 8:
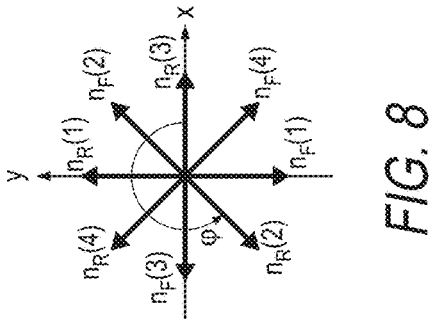
FIG. 8 is a diagram showing exemplary orientations, about the optical axis, of normal vectors of the partially reflective surfaces of the front end of the linear laser resonator of FIG. 1.

FIG. 8 is a diagram showing exemplary orientations of normal vectors $n_R$ and $n_F$ about optical axis 190 in laser 100. The FIG. 8 diagram pertains to the example configuration of wedges 132 depicted in FIGS. 1 and 2. The FIG. 8 diagram assumes that angles $\theta_R$ and $\theta_F$ are of equal magnitude and on opposite sides of optical axis 190 for each wedge 132, corresponding to each symmetry axis S of the FIG. 7 diagram being orthogonal to optical axis 190. The FIG. 8 diagram shows the projection of normal vectors $n_R$ and $n_F$ of wedges 132(1), 132(2), 132(3), and 134(4) onto the xy-plane of coordinate system 290 (see FIG. 2). The projection of each normal vector $n_R$ and $n_F$ is at a different azimuthal angle q about optical axis 190, which is equivalent to each of these normal vectors being tilted away from optical axis 190 in a different tilt direction. In this balanced example, normal vectors $n_R$ and $n_F$ are evenly distributed about optical axis 190.

Even distribution of symmetry axes S normal vectors $n_R$ and $n_F$ about optical axis 190 may be helpful for limiting losses in resonator 102. Depending on, e.g., the shape of chamber 110 and electrode configuration, such even distribution may provide optimal blurring of fine structure. However, even distribution may not be required to achieve a desired fine-structure blurring and a desired output power. In some scenarios, where chamber 110 and the associated electrode configuration induce asymmetry, a less even distribution of symmetry axes S and normal vectors $n_R$ and $n_F$ may be advantageous.

Figure 9:
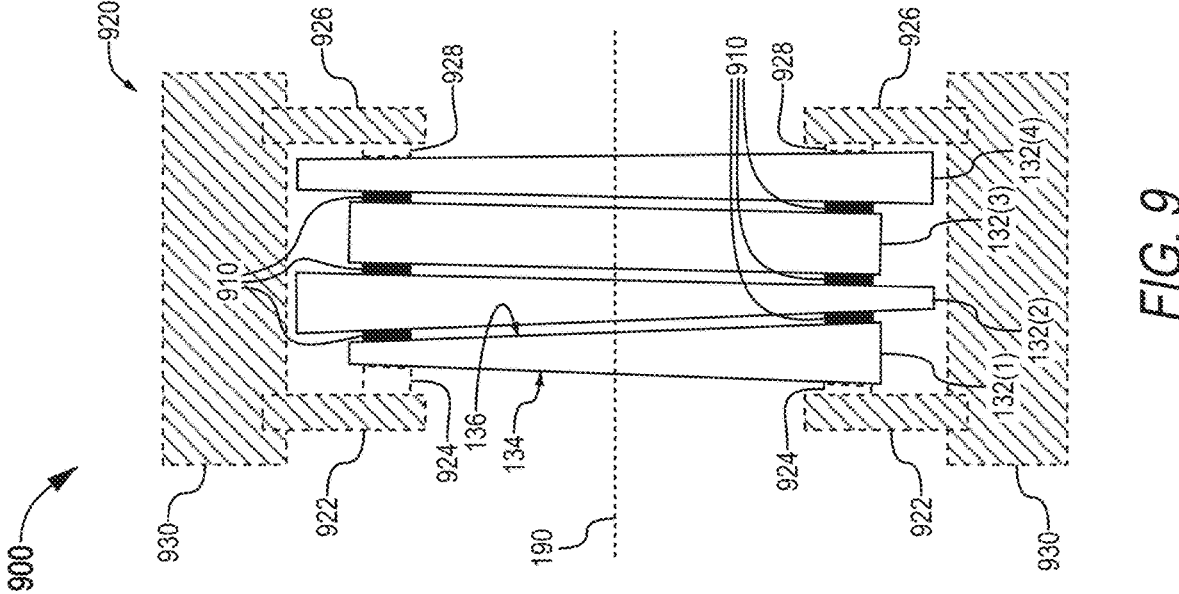
FIG. 9 is a cross-sectional view of a wedge assembly, wherein the wedges of an example of the FIG. 1 excimer laser are stacked against each other in a rigid stack.

FIG. 9 is a cross-sectional view of one wedge assembly 900, wherein wedges 132 of the example of laser 100 depicted in FIGS. 1 and 2 are stacked against each other in a rigid stack. Wedge assembly 900 may simplify the process of assembling and aligning front end 130 of resonator 102, as compared to an embodiment where each wedge 132 is separately mounted and aligned. Wedge assembly 900 may include spacers 910 between adjacent wedges 132.

In one embodiment, wedge assembly 900 includes a holder 920 that holds the stack of wedges 132. Although not shown in FIG. 9, holder 920 may be adjustable so as to adjust the orientation of the rigid stack of wedges 132. In one implementation, shown in FIG. 9, holder 920 clamps the stack of wedges 132 between a rear support 922 and a front support 926. Supports 922 and 926 may be mounted in an outer housing 930. Suitable spacers 924 and 928 may provide spring action between holder 920 and the stack of wedges 132, so as to secure the stack of wedges 132 when the rearmost surface (surface 134 of wedge 132(1)) and the frontmost surface (surface 136 of wedge 132(4)) are not parallel to each other.

In the embodiment depicted in FIG. 9, spacers 910 are planar. Consequently, surface 134 of wedge 132(2) is parallel to surface 136 of wedge 132(1), surface 134 of wedge 132(3) is parallel to surface 136 of wedge 132(2), and surface 134 of wedge 132(4) is parallel to surface 136 of wedge 132(3). This embodiment leads to some degeneration in the tilt angles of surfaces 134 and 136 relative to optical axis 190. Specifically, instead of the normal vectors $n_R$ and $n_F$ of the four wedges 132 having eight different projections onto the xy-plane, as shown in FIG. 8, there are only five different projections.

Figure 10:
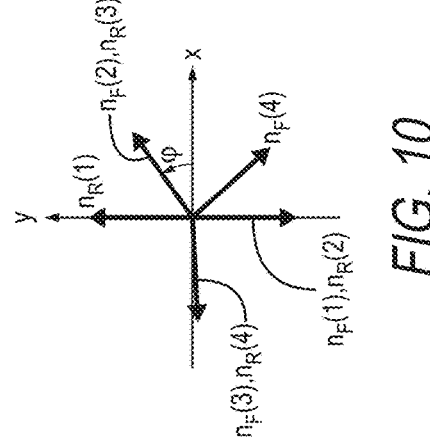
FIG. 10 shows normal-vector projections onto the xy-plane for an embodiment of the FIG. 9 wedge assembly employing planar spacers between the wedges.

FIG. 10 shows the different normal-vector projections onto the xy-plane of coordinate system 298 (see FIG. 2) for one planar-spacer embodiment of wedge assembly 900. As compared to the diagram of FIG. 8, there are only five different projections, and some of the remaining five azimuthal angles φ are slightly modified. Although the normal-vector projections are not even distributed about optical axis 190, the normal-vector projections are still reasonably distributed about optical axis 190 with the largest angular separation between adjacent normal-vector projections being only a little more than 90 degrees.

Referring again to FIG. 9, planar spacing material is readily available and simplifies the assembly process, and the depicted embodiment will provide sufficient fine-structure blurring for many scenarios despite the degeneration in tilt angles. Alternatively, spacers 910 may be non-planar such that the normal vectors $n_R$ and $n_F$ of the four wedges 132 have eight different projections onto the xy-plane. For example, non-planar spacers 910 may be configured to ensure that each symmetry axis S of the four wedges 132 is orthogonal to optical axis 190.

The examples of FIGS. 1, 2, and 7-10 are readily extendable to a different number of wedges 132, for example between two and six wedges 132. Two wedges 132 may be sufficient for some applications but better fine-structure blurring is achievable with more than two wedges 132. On the other hand, the added benefit decreases as the number of wedges 132 increases. The number of wedges 132 required to achieve a certain beam uniformity depends on whether any of the involved surfaces 134 and 136 are parallel to each other, as when wedge assembly 900 is implemented with planar spacers 910. When wedges 132 are stacked against each other with planar spacers 910 therebetween, at least four wedges 132 or at least six wedges 132 may suffice to mostly eliminate fine structure in output beam 182. In a more general case, not limited to the use of wedges, it may suffice that front end 130 of laser 100 includes at least four output-coupling mirrors with mutually non-parallel normal vectors, with no set of three of the at least four mutually non-parallel normal vectors being coplanar.

Furthermore, as mentioned above in reference to FIG. 2, convex end-mirror 122 in itself provides some degree of fine-structure blurring. Thus, in some embodiments, front end 130 may include only two or three output-coupling mirrors with mutually non-parallel normal vectors or even just a single output-coupling mirror. However, these embodiments having less than four output-coupling mirrors with mutually non-parallel normal vectors are not expected to provide as good fine-structure blurring as embodiments as embodiments with at least four such output-coupling mirrors.

When laser 100 includes N wedges 132, resonator 102 has 2N output-coupling mirrors. In one embodiment, wedges 132 are arranged such that none of normal vectors $n_R$ and $n_R$ associated with these 2N output-coupling mirrors are parallel to each other or optical axis 190. In this embodiment, front end 130 has 2N mutually non-parallel normal vectors $n_R$ or $n_F$. Each of these normal vectors is tilted away from optical axis 190 in a respective tilt direction by a respective tilt angle (e.g., at least 0.02 mrad). For example, when N=2 in this embodiment, there are four mutually non-parallel normal vectors. Wedges 132 may be arranged such that each tilt direction is unique, that is, such that there are 2N unique tilt directions. The configuration depicted in FIGS. 1 and 2, and further discussed in reference to FIGS. 7 and 8, is an example of this situation. The unique tilt directions may be somewhat evenly distributed about optical axis 190, for example with each 135-degree azimuthal-angle interval containing at least one normal vector. More generally, when any one of the 2N mutually non-parallel normal vectors is selected as a reference-axis, each other one of the 2N mutually non-parallel normal vectors may be tilted away from the reference-axis in a different respective tilt direction (by e.g., at least 0.02 mrad). This is the case even if one normal vector is parallel to optical axis 190 and regardless of which one of the 2N mutually non-parallel normal vectors is selected as a reference-axis. In other words, no set of three of the 2N mutually non-parallel normal vectors are coplanar. Having one normal vector parallel to optical axis 190 is not expected to degrade the performance.

In another embodiment, the normal vectors of some of the 2N output-coupling mirrors are parallel such that there are less than 2N mutually non-parallel normal vectors. For example, when N wedges 132 are stacked against each other with planar spacers therebetween and symmetry axis S of each wedge 132 is at a different azimuthal angle about optical axis 190, there are N+1 mutually non-parallel normal vectors. When none of these N+1 mutually non-parallel normal vectors are parallel to optical axis 190, each is tilted away from optical axis 190 in a different tilt direction, for example with each tilt angle being at least 0.02 mrad. When one of the N+1 mutually non-parallel normal vectors is parallel to optical axis 190, it still holds true that no set of three of the 2N mutually non-parallel normal vectors are coplanar. Phrased differently, it still holds true that, when any one of the 2N mutually non-parallel normal vectors is selected as a reference-axis, each other one of the 2N mutually non-parallel normal vectors is tilted away from the reference-axis in a different respective tilt direction (by e.g, at least 0.02 mrad).

Figures 11A, 11B:
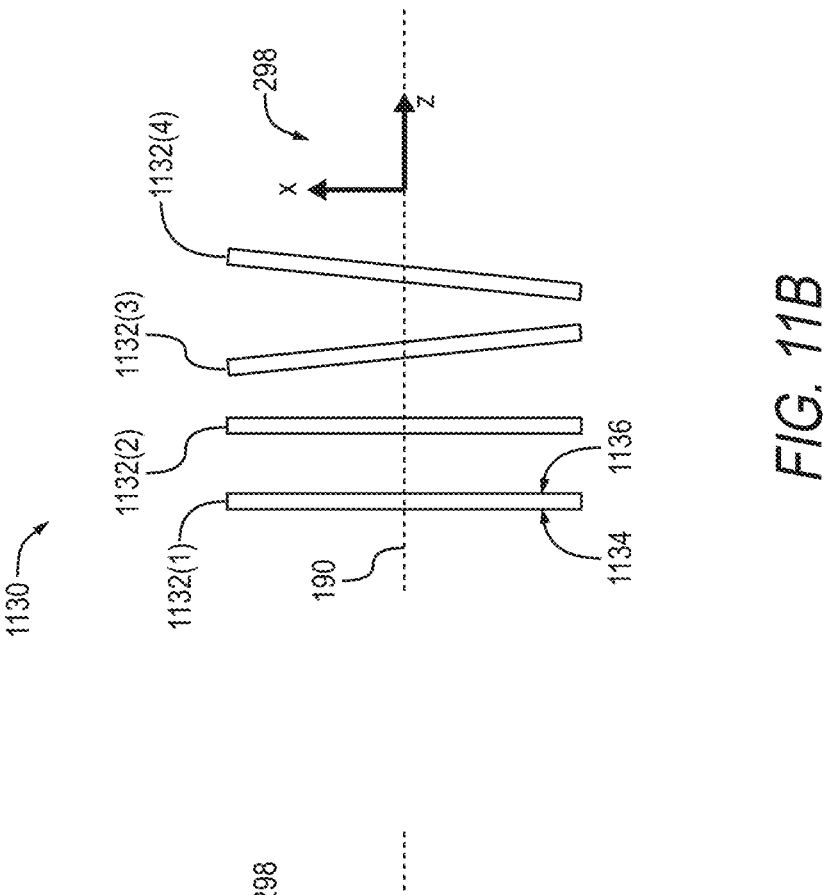
FIGS. 11A and 11B illustrate a set of planar output-coupling mirrors forming an alternative front end that may be implemented in the linear laser resonator of FIG. 1 instead of wedges, according to an embodiment.

FIGS. 11A and 11B illustrate a set of planar output-coupling mirrors 1132 forming one alternative front end 1130 that may be implemented in laser 100 instead of wedges 132. FIGS. 11A and 11B are cross-sectional views of front end 1130 taken in the yz-plane and the xz-plane, respectively, of coordinate system 298 (see FIG. 2). In the depicted example, front end 1130 has four mirrors 1132, the two rearmost mirrors 1132(1) and 1132(2) are tilted in the yz-plane, and the two frontmost mirrors 1132(3) and 1132(4) are tilted in the xz-plane. Front end 1130 may include more than four mirrors 1132 and/or mirrors 1132, and the tilt angles and directions of mirrors 1132 relative to optical axis 190 may be different from what is shown in FIGS. 11A and 11B. Each mirror 1132 has a rear-facing surface 1134 and a front-facing surface 1136. In one embodiment, both of surfaces 1134 and 1136 are partially reflective. In another embodiment, one of surfaces 1134 and 1136 is reflective and the other one has an anti-reflective coating.

Any configuration of output-coupling mirrors that can be realized with wedges 132, may instead be realized with mirrors 1132. Additionally, when using mirrors 1132 instead of wedges 132, it is possible to incorporate an uneven number of output-coupling mirrors. However, wedges 132 may be advantageous over mirrors 1132 for practical reasons. For example, as discussed above in reference to FIG. 9, the wedge shape allows for stacking with planar spacers therebetween. In contrast, non-planar spacers are required to achieve mutually non-parallel normal vectors with stacked planar mirrors 1132.

Figures 12, 13:
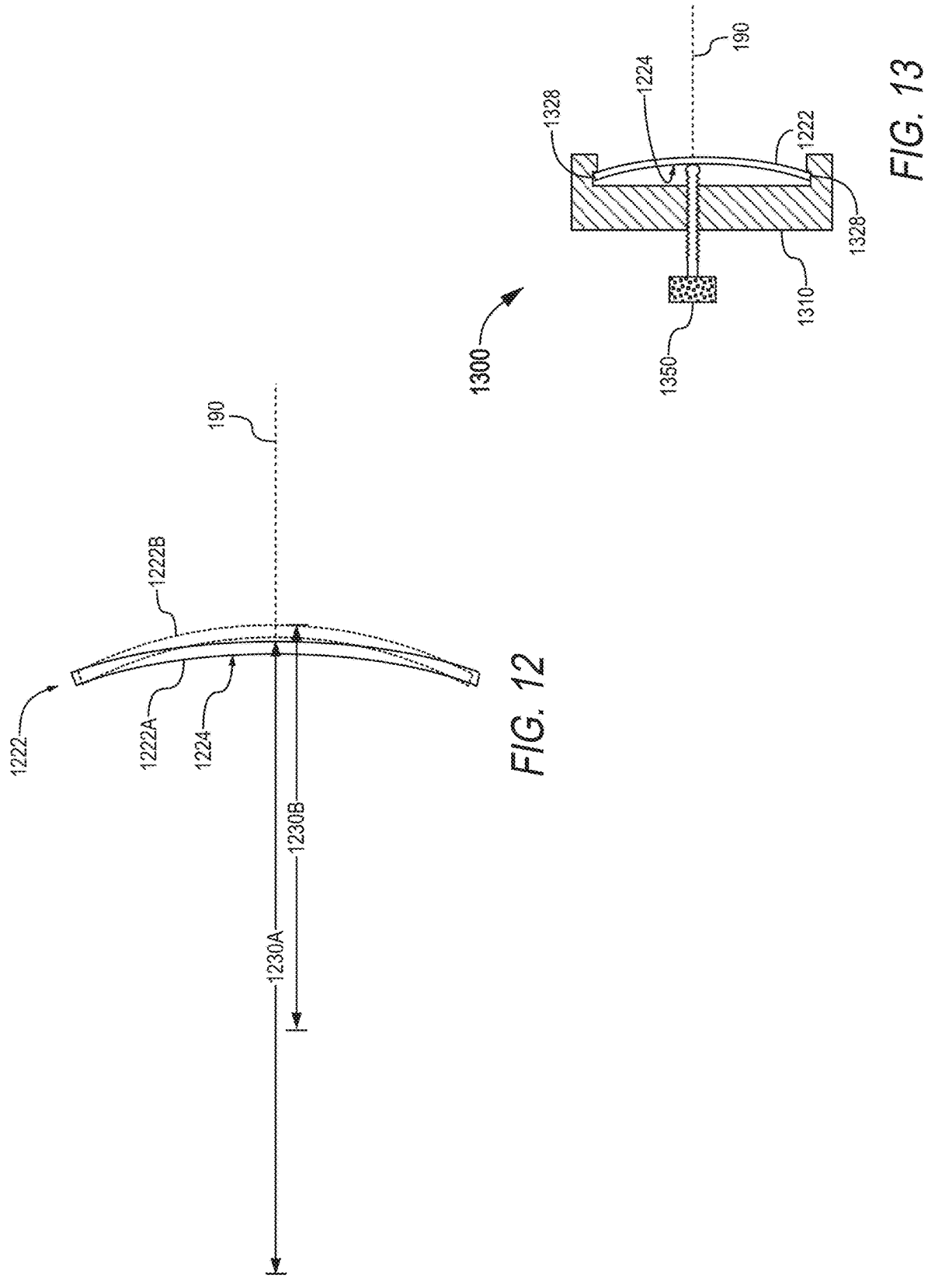
FIG. 12 illustrates a convex end-mirror with adjustable curvature, according to an embodiment.
FIG. 13 illustrates an end-mirror assembly that incorporates the convex end-mirror of FIG. 12 and allows for adjustment of its curvature in the FIG. 1 excimer laser, according to an embodiment.

FIG. 12 illustrates one convex end-mirror 1222 with adjustable curvature. End-mirror 1222 is an embodiment of end-mirror 122. In one state 1222A, the curvature of end-mirror 1222 in the depicted transverse dimension is 1230A. In another more strongly curved state 1222B, the curvature of end-mirror 1222 in the depicted transverse dimension is 1230B. Adjustment of the radius of curvature is achieved by applying pressure to the back surface 1224 of end-mirror 1222 while at least part of the periphery of end-mirror 1222 is fixed. Back surface 1224 faces away from resonator 102. Adjustability of the curvature of end-mirror 1222 allows for tuning the divergence and transverse size of output beam 182 to be most suitable for a given use scenario. For example, the divergence and size of output beam 182 may be matched to downstream optics such as beam delivery optics.

FIG. 13 illustrates one end-mirror assembly 1300 that incorporates convex end-mirror 1222 and allows for adjustment of its curvature in laser 100. Assembly 1300 includes a holder 1310 that holds end-mirror 1222, and an actuator screw 1350 that applies pressure to back surface 1224. A periphery 1328 of end-mirror 1222 is fixed by holder 1310. Thus, when actuator screw 1350 is turned to press against back surface 1224, end-mirror 1222 attains a convex curvature, as shown in FIG. 13. As the pressure by actuator screw 1350 on back surface 1224 increases, the radius of curvature of end-mirror 1222 decreases. Depending on which parts of periphery 1328 are restricted by holder 1310, pressure by actuator screw 1350 may induce curvature that is or is not symmetric with respect to rotation about optical axis 190.

Figure 14:
FIG. 14 plots an exemplary relative displacement of a rotationally symmetric embodiment of the convex end-mirror of FIG. 12 as a function of arc length across its transverse dimension.

FIG. 14 plots exemplary relative displacement 1400 of a rotationally symmetric embodiment of convex end-mirror 1222 as a function of position across its transverse dimension. In this example, the center of end-mirror 1222 is displaced by approximately 5.5 micrometers relative to its periphery. The periphery is 30 millimeters away from the center. The curvature is not exactly spherical. However, when the plotted displacement is approximated with a spherical curvature, the displacement of 5.5 micrometers corresponds to a radius of curvature of approximately 80 meters.

Figure 15:
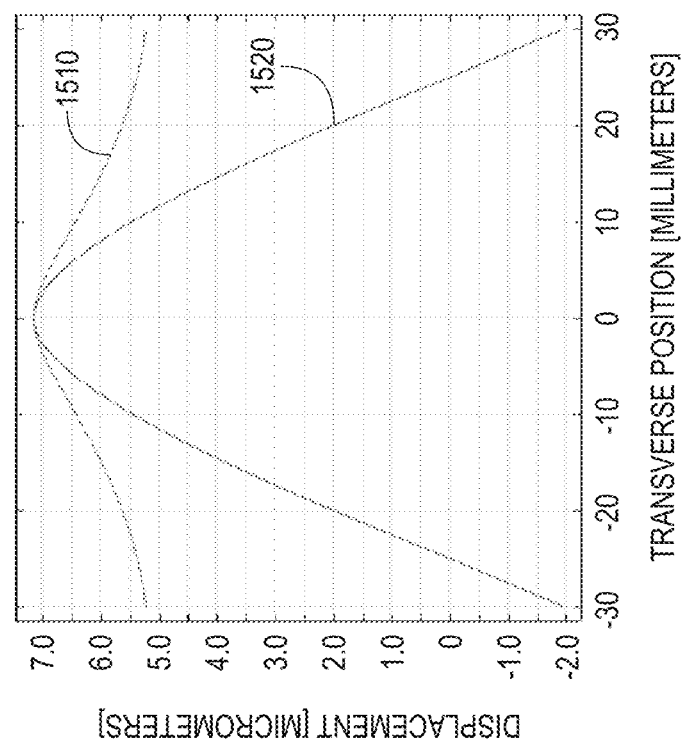
FIG. 15 plots exemplary relative displacements of an asymmetric embodiment of the convex end-mirror of FIG. 12 as a function of arc length across two orthogonal transverse dimensions.

FIG. 15 plots exemplary relative displacements of an asymmetric embodiment of convex end-mirror 1222 as a function of arc length across two orthogonal transverse dimensions. Displacement 1510 pertains to the transverse dimension with weakest curvature, and displacement 1520 pertains to the transverse dimension with strongest curvature. In the least curved dimension, the center of end-mirror 1222 is displaced by approximately 2 micrometers relative to the periphery 30 millimeters away. In the dimension with strongest curvature, the center of end-mirror 1222 is displaced by approximately 9 micrometers relative to the periphery 30 millimeters away. When approximating with spherical curvatures, the corresponding radii of curvature are approximately 220 and 50 meters, respectively.

The present invention is described above in terms of a preferred embodiment and other embodiments. The invention is not limited, however, to the embodiments described and depicted herein. Rather, the invention is limited only by the claims appended hereto.

What is claimed is:

1. An excimer laser, comprising:
a chamber configured to contain a gas mixture between a rear end and a front end of a linear laser resonator;
a convex end-mirror defining the rear end, the convex end-mirror having adjustable curvature; and
a plurality of output-coupling mirrors that (a) are distributed along an optical axis of the linear laser resonator, (b) collectively define the front end, and (c) have a respective plurality of normal vectors pointing toward the rear end, the plurality of normal vectors including four mutually non-parallel normal vectors, wherein no three of the four mutually non-parallel normal vectors are coplanar.

2. The excimer laser of claim 1, wherein each of the at least four mutually non-parallel normal vectors is tilted away from the optical axis in a different respective tilt direction.

3. The excimer laser of claim 2, wherein the respective tilt directions of the at least four mutually non-parallel normal vectors are distributed about the optical axis such that each 135-degree azimuthal-angle-interval about the optical axis contains at least one of the tilt directions.

4. The excimer laser of claim 1, wherein the output-coupling mirrors include a plurality of output-coupling mirror pairs, each output-coupling mirror pair being rear-facing and front-facing surfaces of a wedge.

5. The excimer laser of claim 4, wherein each wedge has a symmetry axis located in a mirror plane between the rear-facing and front-facing surfaces and coplanar with the normal vectors of the rear-facing and front-facing surfaces, the respective symmetry axes of the wedges being mutually non-parallel and oriented at different respective azimuthal angles about the optical axis.

6. The excimer laser of claim 4, wherein, for each wedge, an angle between the rear-facing and front-facing surfaces is between 0.02 and 0.5 milliradians.

7. The excimer laser of claim 1, wherein each non-rearmost one of the output-coupling mirrors is tilted away from the normal vector of the rearmost one of the output-coupling mirrors by at least 0.02 milliradians.

8. The excimer laser of claim 1, wherein a longitudinal distance between a frontmost one of the output-coupling mirrors and a rearmost one of the output-coupling mirrors is no more than 10% of a length of the linear laser resonator between the convex end-mirror and the frontmost one of the output-coupling mirrors.

9. The excimer laser of claim 1, the convex end-mirror has an on-axis curvature, on the optical axis, characterized by a radius of curvature that exceeds a length of the linear laser resonator between the convex end-mirror and a frontmost one of the output-coupling mirrors.

10. The excimer laser of claim 1, wherein curvature of the convex end-mirror is rotationally symmetric about the optical axis.

11. The excimer laser of claim 1, wherein the convex end-mirror has stronger curvature in a first transverse dimension than in a second transverse dimension.

12. The excimer laser of claim 1, further comprising a holder for the convex end-mirror, the holder including an actuator configured to adjust the curvature by applying pressure to a rear surface of the convex end-mirror facing away from the linear laser resonator.

13. The excimer laser of claim 1, wherein reflectivity of each of the output-coupling mirrors, at a wavelength of a laser beam generated by the excimer laser, is between 1% and 10%.

14. The excimer laser of claim 1, wherein the convex end-mirror is at least 99% reflective at a wavelength of a laser beam generated by the excimer laser.

15. An excimer laser, comprising:
a chamber configured to contain a gas mixture between a rear end and a front end of a linear laser resonator;
a convex end-mirror defining the rear end; and
a plurality of output-coupling mirrors that (a) are distributed along an optical axis of the linear laser resonator, (b) collectively define the front end, and (c) have a respective plurality of normal vectors pointing toward the rear end, the plurality of normal vectors including four mutually non-parallel normal vectors, wherein no three of the four mutually non-parallel normal vectors are coplanar;
wherein the output-coupling mirrors include a plurality of output-coupling mirror pairs, each output-coupling mirror pair being rear-facing and front-facing surfaces of a wedge having a symmetry axis located in a mirror plane between the rear-facing and front-facing surfaces and coplanar with the normal vectors of the rear-facing and front-facing surfaces, the respective symmetry axes of the wedges being mutually non-parallel and oriented at different respective azimuthal angles about the optical axis, the wedges being held against each other in a stack with a spacer between each pair of adjacent wedges.

16. The excimer laser of claim 15, wherein each spacer is planar.

17. The excimer laser of claim 15, further comprising a holder for adjusting orientation of the stack.

18. The excimer laser of claim 15, wherein the output-coupling mirror pairs include four output-coupling mirror pairs.

19. The excimer laser of claim 15, wherein the output-coupling mirror pairs include six output-coupling mirror pairs.

* * * * *